United States Patent [19]

Hagendorn

[11] 4,103,864

[45] Aug. 1, 1978

[54] HYDRAULIC POSITIONER FOR VALVES

[75] Inventor: Heinrich Hagendorn, Wesel, Fed. Rep. of Germany

[73] Assignee: Siemens Aktiengesellschaft, Berlin and Munich, Fed. Rep. of Germany

[21] Appl. No.: 754,358

[22] Filed: Dec. 27, 1976

[30] Foreign Application Priority Data

Dec. 29, 1975 [DE] Fed. Rep. of Germany ....... 2558959

[51] Int. Cl.² ............................................ F16K 31/122
[52] U.S. Cl. .................................... 251/63.6; 251/94; 251/25; 92/130 B; 92/130 D
[58] Field of Search ...................... 251/63.6, 63.5, 73, 251/75, 26, 25, 337, 61.4; 92/130 B, 130 D

[56] References Cited

U.S. PATENT DOCUMENTS

| 1,995,561 | 3/1935 | Belanger et al. ............... 251/63.6 X |
| 2,315,816 | 4/1943 | Rodgers ............................ 92/130 D |
| 3,051,433 | 8/1962 | Dale et al. ........................ 251/94 X |
| 3,523,675 | 8/1970 | Grove et al. ........................... 251/94 |

*Primary Examiner*—Arnold Rosenthal
*Attorney, Agent, or Firm*—Kenyon & Kenyon, Reilly, Carr & Chapin

[57] ABSTRACT

A positioner having a differential piston which is hydraulically locked by the oil pressure of a tripout valve and which in turn cocks a closing and an opening spring against each other, in which, after the tripout oil pressure falls, the closing spring is first released, pulling the piston up, thereby permitting the opening spring to open the valve suddenly.

10 Claims, 6 Drawing Figures

HYDRAULIC POSITIONER FOR VALVES

BACKGROUND OF THE INVENTION

This invention relates to hydraulic positioners in general and more particularly to an improved hydraulic positioner which permits faster operation of a valve.

In process or power generation plants, valves or other devices are frequently required which must open suddenly in the case of a failure or under certain other operating conditions. Such valves are necessary to permit a discharge or a bypass in order to prevent damage to the main plant or to insure an emergency supply to subsequent parts of a plant. For example, in some steam power plants there are auxiliary devices or consumers which normally utilize steam exhausted by a turbine. Should the turbine tripout operate to shut down the turbine, there is a need to continue supplying these consumers. Thus, fast operating valves are often connected in parallel with turbine tripout valves for this purpose.

In order to insure a realiable and rapid response of valves of this nature, a positioner is required, which, on one hand, keeps the valve securely closed but which, on the other hand, will open the valve without delay quickly and without trouble if the appropriate operating conditions are present.

In view of this, it is object of the present invention to provide a positioner which meets these requirements to the utmost, i.e. a positioner which automatically opens the valve with maximum speed and which can also reclose the valve automatically if necessary. Furthermore, a positioner which operates realible in all operating cases without the possibility, for example, of a different thermal expansion exerting an influence on the function of the positioner is required.

SUMMARY OF THE INVENTION

In accordance with the present invention, this problem is solved by providing a positioner which has in its housing a stepped differential piston which encloses a closing spring acting on a coupling element between the drive and the valve and an opening spring which acts on the coupling element in the opposite direction and is braced against the housing bottom. Furthermore, the differential piston keeps the two springs against each other by means of oil pressure acting thereon. The oil pressure is that of a hydraulic self-holding or latching system which maintains the valve closed. The system is arranged such that, if the oil pressure drops, the closing spring is first released permitting the differential piston to move upward. Subsequently the opening spring can then open the valve suddenly.

In order to accomplish these various functions, the step-shaped enlargement of the differential piston is guided in a correspondingly enlarged step chamber in the actuating housing. The step chamber has an inlet and an outlet for the oil of the hydraulic latching system. The outlet is covered by the differential piston when the positioner is in its cocked position.

Reclosing of the valve can be accomplished mechanically by hand or in a fully automatic manner using hydraulic means. For example, the top side of the differential piston can be acted upon by a threaded sleeve which operated by a hand wheel and pushes the piston downward into the cocked position. Alternatively, the piston can be pushed down into the cocked position by means of oil pressure from a separate oil supply source.

In order to prevent an unintentional opening of the fast operating valve, the differential piston is adapted to be mechanically locked in the cocked position. For this purpose the differential piston may have an extension with a transverse hole into which a locking pin can be engaged. The locking pin is adapted to be acted upon by the oil supply source and is guided by a spring loaded piston.

DETAILED DESCRIPTION OF THE INVENTION

Figure 1:
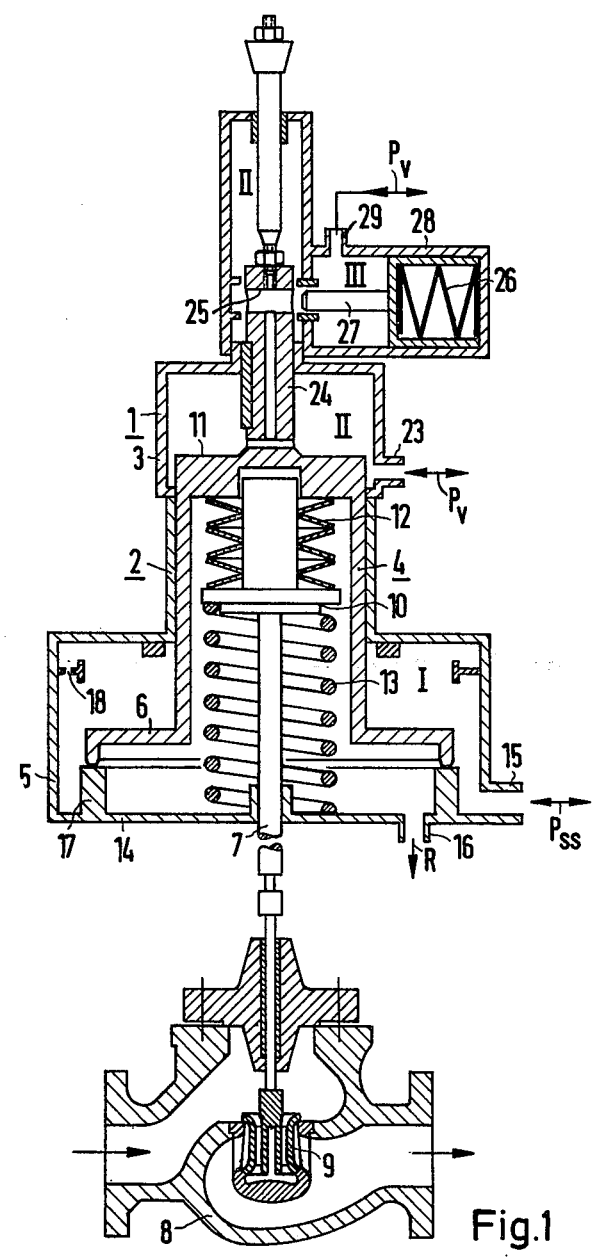
FIG. 1 is a longitudinal cross section through a positioner according to the present invention which is fully automatic.

FIG. 1 illustrates a first embodiment of the present invention. As an example, the positioner is shown coupled to a fast acting valve in a steam turbine installation. The positioner 1 includes a housing 2 which is enlarged in a step fashion downward. A similarly stepped differential piston 4 is guided in the smaller, upper part 3 of the housing 2. The differential piston 4 has a radial shoulder 6 which is situated in the lower, enlarged housing part 5. The differential piston, in this embodiment, encloses concentrically the valve spindle 7 of a fast acting valve 9 guided in a valve housing 8. Within the differential piston 4, a closing spring 12 in the form of a stack of cup springs is disposed between a stop plate 10 arranged on the valve spindle 7 and the upper end face 11 of the differential piston 4. On the other side of the stop plate 10 an opening spring 13 acts. Spring 13 is braced with its other end against the bottom 14 of the housing 2. An inlet 15 is located in the enlarged lower housing part 5. In the illustrated embodiment this inlet line is connected to the tripout oil line of the turbine. Also in the bottom part 5 is a return line 16.

When the differential piston 4 is moved to the closed position shown on FIG. 1, at the same time closing the fast acting valve 9, the springs 12 and 13 are cocked. At this time, the space I in the lower housing part is pressurized by the tripout oil which flows in through in the inlet 15. The bottom portion of the piston 6 is against the stop 17 closing off the outlet 16. As a result, hydraulic latching is obtained. If a fast shutdown of the tubine is required, the tripout oil pressure drops causing the pressure in the space I to drop to remove the hydraulic latching. It is now possible for the energy stored in the springs 12 and 13 to be released. In this process the closing spring 12 is first released pushing the differential piston 4 upward. After a certain dead time, which depends on the characteristic of the closing spring 12 and the load to be moved, the opening spring 13 is able to move the valve spindle 7 with its attached element 9 almost in a shock-like fashion and thus open the steam valve in a fraction of a second. The impact when the differential piston 4 hits the upper stop is greatly reduced by a hydraulic damper 18 in the space I. This heavily throttles the flow of the tripout oil which is being pushed out of the space I through the outlet 16 just before the upper stop of the radial shoulder 6 of the differential piston 4 is reached. Additional damping can be achieved by proper selection of the closing spring 12.

Figure 3:
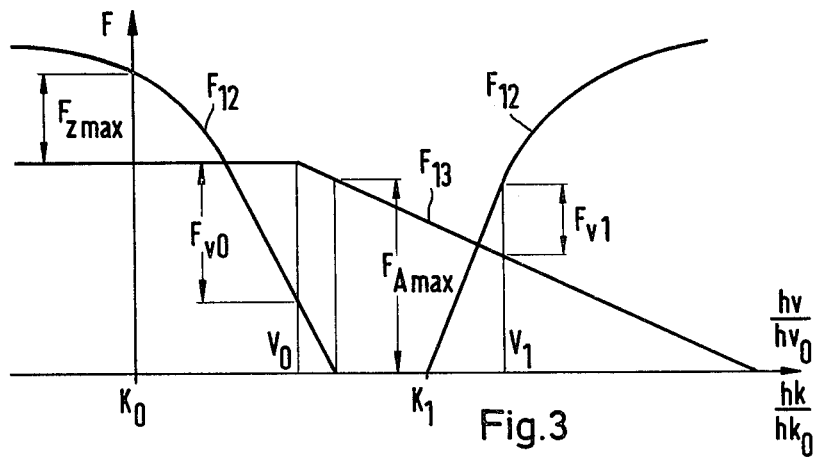
FIG. 3 is a force-excursion diagram for the springs and for the lifting of the differential piston and valve spindle.

The distance traveled by the valve spindle 7 is not identical with the constant stroke of the differential piston 4. Rather it is determined by the characteristics of the two springs and the external load, i.e., the weight of the closing element 9, and the steam forces acting thereon. The relationships which result are illustrated in detail on the diagram of FIG. 3. On this diagram the occurring forces F are plotted against the relative valve lift $hv/hv_o$ or the relative piston stroke $hk/hk_o$. The diagram illustrates the shape of the force $F_{12}$ exerted by the closing spring 12 along with the force $F_{13}$ of the opening spring and are their correlation when the valve is opened and closed. Initially, both springs act against each other. The valve spindle 7 or the closing element 9 is acted upon by the maximum closing force $F_{zmax}$ of the difference of the forces $F_{12}$ and $F_{13}$. When the pressure in the space I drops and the latching is cleared, the closing spring 12 is able to expand in accordance with the characteristic designated as $F_{12}$ and thereby push the differential piston 4 upward. If at this point a force $F_{vo}$ acts upon the valve in the closing direction, the opening spring 13 begins to lift the valve spindle 7 at the instant when the force $F_{12}$ exerted by the closing 12 has dropped to the point where the difference of the forces $F_{12}$ and $F_{13}$ is larger than the closing force $F_{vo}$ acting on the valve. The opening spring 13 then expands in accordance with its characteristic $F_{13}$, the maximum opening force $F_{Amax}$ being at the complete release of the closing spring 12. When the opening spring 13 has expanded over a certain range, the closing spring 12 is compressed by the geometry of the positioner in accordance with the righthand characteristic $F_{12}$ to the point where the full opening $V_1$ of the valve is reached. As is evident from the diagram, the valve can open further than an amount corresponding to that for equilibrium of the two springs, since after the valve has opened the force $F_{v1}$ still acts in the opening direction. In general terms, the static force equation which applies is as follows:

$$F_{12} - F_{13} + F_V = 0$$

From this equation it can be seen that the lift of the valve spindle is determined only by the characteristics of the two springs and the external load.

An essential feature of the present invention which gives it its fast acting properties is that the differential piston 4 and the valve spindle 7 are mechanically decoupled. Only tensional force transmission is carried out by means of the closing spring 12 and the opening spring 13. This results in two decisive advantages: 1) the positioner can exert a force on the valve spindle 7, and therefore on the closing element 9, in the closed position; and 2) the positioner, as well as the closing element, can reliably reach their individual stops independently of each other. Shifts in the correlation which occur, for example, due to thermal expansion thereby have absolutely no effect.

Figure 2:
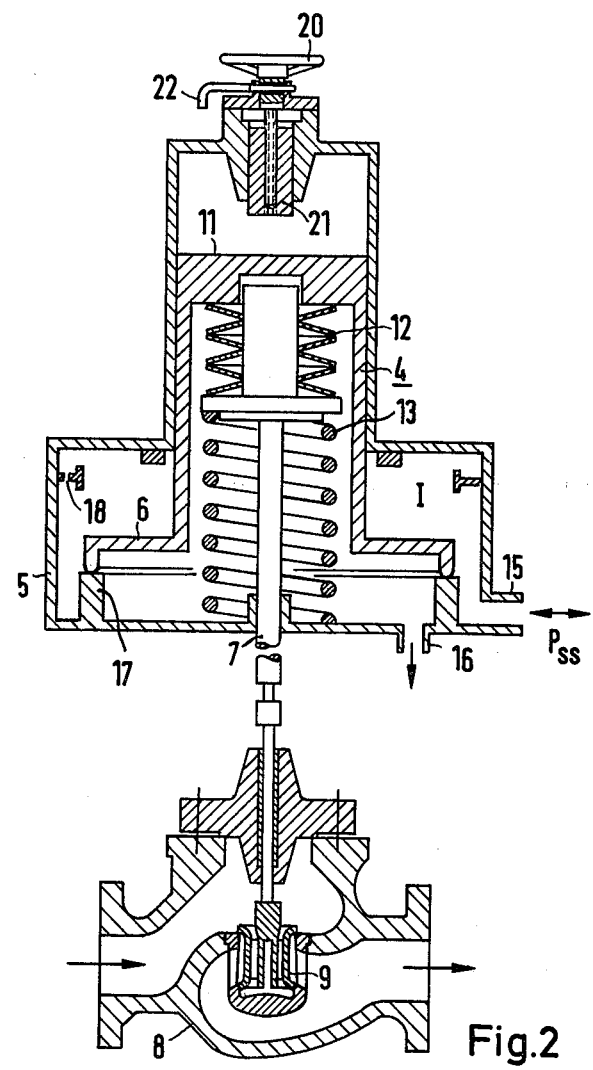
FIG. 2 is a similar view of a positioner of semi-automatic design.

FIG. 2 illustrates a second valve which operates exactly in the manner explained. The only difference is in the upper portion of the valve containing the closing mechanism. The two figures, FIG. 1 and FIG. 2, illustrate two possibilities for closing the positioner and the valve. In the embodiment of FIG. 2 closing is accomplished mechanically by hand. A threaded sleeve 21 which is operated by means of a hand wheel 20 is moved down against the end face 11 of the differential piston. Rotation of the hand wheel 20 causes downward movement of the threaded sleeve 21 pushing the piston into its closed position shown on the figure. This causes the valve cone 9 to be pressed onto its seat by means of the valve spindle 7 which is acted on by the closing spring 12. If the valve is to be locked in this position, a latching pin 22 may be inserted to prevent rotation of the hand wheel. When it is desired to have the positioner ready for operation after the re-opening of the tripout valves, the threaded sleeve is moved up to the position shown once the tripout oil in the space I is built up. To prevent any inadvertent moving down of the threaded sleeve 21, when placed in this automatic operating condition, the pin 22 should again be inserted. In this embodiment the operation is only semi-automatic, i.e., only the opening of the fast acting valve fully automatic.

FIG. 1 illustrates an embodiment which is fully automatic and which permits automatically closing the valve as well as opening it. In this embodiment, an additional inlet 23 is provided which communicates with a space II above the differential piston 4. This inlet can be coupled to a oil supply having a pressure $P_V$. Supplying oil at the pressure $P_V$ causes a force to act on the portion 11 of the piston and move it downward into the position where the valve is closed. When the closed position is reached it is possible to mechanically lock the valve. In order to accomplish this, the differential piston 4 has an extension 24 from its upper end face 11 containing a transverse hole 25 at its upper end. A spring 26 is provided to drive a pin 27 into the transverse hole 25. The drive of the latching pin 27 is guided in a separate, laterally flanged chamber 28. The chamber 28 has a space III which can also be connected to an oil supply source by means of a connection 29. In order to make the positioner ready for operation again once the tripout oil pressure $P_{SS}$ has built up in the space I, the oil is drained from the space II and a pressure built up in the space III causing the latching pin 26 to be withdrawn and the differential piston 4 unlocked.

Figure 4:
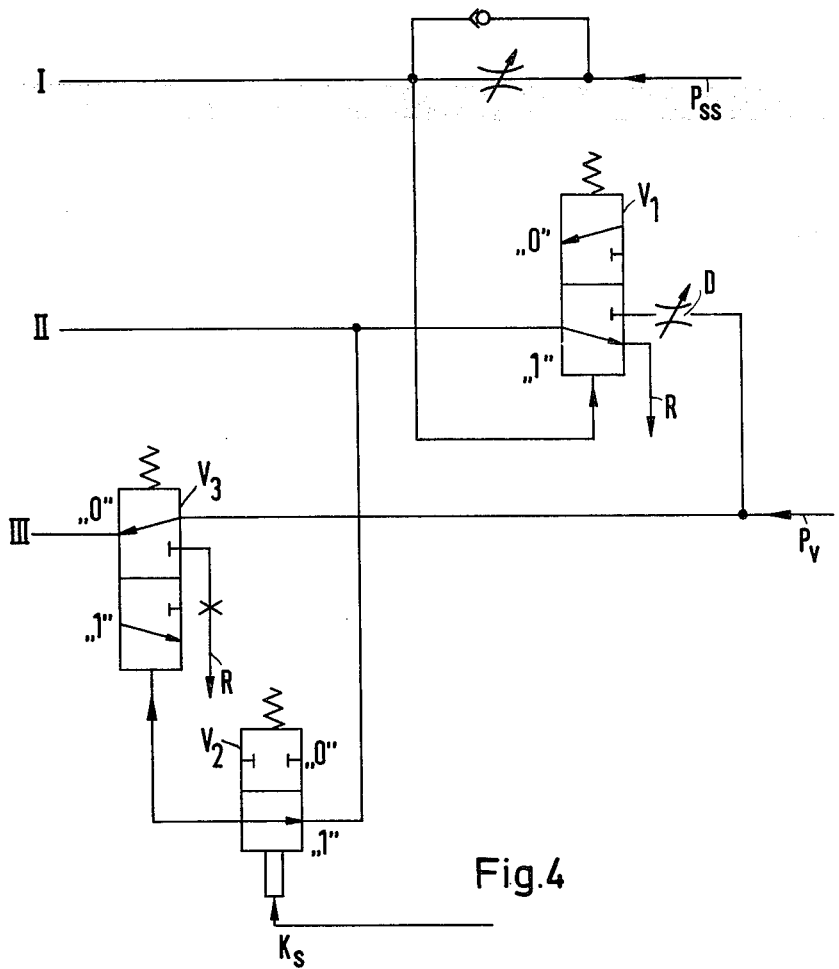
FIG. 4 is a schematic diagram of the control of the fully automatic positioner of FIG. 1.

FIG. 4 is a diagram which illustrates in more detail the manner in which pressure is supplied to the various spaces I, II, and III to carry out automatic operation of the positioner. The figure shows the normal state with the valve closed. In this condition, the full tripout oil pressure $P_{SS}$ is present and the space I fully pressurized. Under this condition the space II must be without pressure. Thus, a first control valve $V_1$ is shown as being in a switching position "1" in which the space II is connected with the return line R. As illustrated, the valve $V_1$ is acted upon by the pressure $P_{SS}$ to maintain it in this position. It is necessary that the pin 27 of FIG. 1 be retracted. Thus, oil pressure must be supplied to the space III. To accomplish this, a valve $V_3$ is utilized and is shown in the "0" position in which the pressure $P_V$ is connected through the valve to III. space III This valve is caused to move from its "0" position to its "1" position when acted upon by the pressure $P_V$ coupled through the valve $V_1$ to the space II and also coupled through an additional valve $V_2$ which is acted upon by a signal $K_S$. However, with the valve $V_3$ unoperated and in the "0" position full oil pressure is supplied to the space III and the differential piston 4 is unlocked.

If a tripout occurs and the pressure $P_{SS}$ drops, the pressure in the space I disappears. The valve $V_1$ thus switches from the "1" position to the "0" position. Because of the installation of a properly adjusted choke D at the inlet to the valve $V_1$ the space II initially remains without pressure. At the time of tripout, the signal $K_S$ is removed from the valve $V_2$ and it moves to its "0" position. The differential piston moves upward and the space III remains at the pressure $P_V$ with the drive unlocked since the valve $V_3$ has not switched and the pressure $P_V$ remains in the space III.

The closing of the valve and the locking of the positioner depends on the operating conditions of the installation and its steam flow as will be explained later. The positioning velocity itself is set by means of the throttling valve D. The pressure $P_V$ is applied to the space II and, after the closing position of the differential piston 4 is reached, the valve $V_2$ is again caused to switch from "0" to "1". Since a pressure is now present at the actuating inlet to the valve $V_3$, this valve switches from "0" to "1" so that there is no pressure in the space III and the piston is locked. At this time the oil supply pressure can then be switched off.

When the positioner is to be unlocked again and made ready for operation, the pressure $P_V$ is again applied to the space II. After the tripout valve at the turbine is reset again, the pressure $P_{SS}$ is built up so that the pressure $P_{SS}$ again prevails in the space I. After the hydraulic latching of the differential piston has taken place, the valve $V_1$ switches from "0" to "1" so that the space II is again without pressure and the valve $V_3$ switches from "1" to "0". Thus, the pressure $P_y$ is again applied to the space III so that the positioner is unlocked and the normal ready state again reached.

Figure 5:
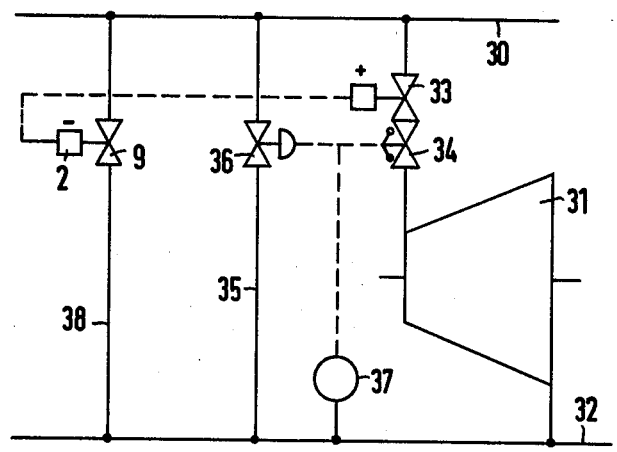
FIGS. 5 and 6 are schematic illustrations of two applications for the fast acting valve of the present invention.
Figure 6:
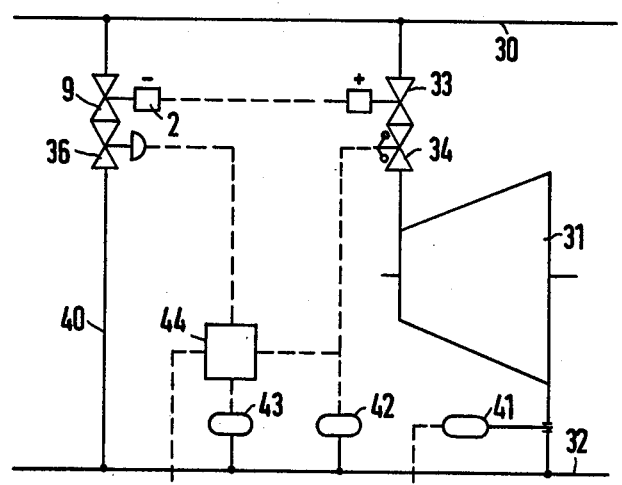

FIGS. 5 and 6 illustrate two possible uses of the positioners illustrated on FIGS. 1-4. In both cases, a turbine 31 is supplied with steam from a line 30. The exhaust from the steam is supplied over a line 32 to auxiliary equipment consumers. In conventional fashion, the steam to the turbine is coupled through a tripout valve 33 and a control valve 34. In the embodiment of FIG. 5 a pressure and temperature breakdown valve 36 is connected in a bypass line between the lines 30 and 32. This is controlled as a function of the position of the control valve 34 and a pressure control 37 for the steam line 32. Since the breakdown valve 36 needs a relatively long time to open completely, it cannot immediately supply steam to the line 32 if the tripout valve 33 suddenly closes. Thus, in order to supply the necessary steam to the line 32, a fast opening valve 9 with a fully automatic drive such as that illustrated by FIG. 2 is provided in a further bypass line 38. If tripout occurs, the fast acting valve 9 suddenly opens and insures uninterrupted feeding of steam to the consumer line 32. If then, after a certain time, the steam breakdown valve 36 is completely ready for operation, the fast acting valve 9 recloses. Specifically, this is accomplished slowly as the breakdown valve 36 opens synchronously and then takes over the bypass function itself. With reference to FIG. 4, such is accomplished by means of the choke D gradually admitting pressure to the space II of FIG. 1 to cause the valve to slowly close.

FIG. 6 illustrates the use of a semi-automatic positioner such as that of FIG. 2. In the embodiment illustrated only a single bypass line 40 is utilized. In this line both the fast acting valve 9 and the pressure and temperature steam breakdown valve 36 are connected in series. The breakdown valve is regulated by means of a flow meter 41, a pressure control 42 and a temperature measuring device 43 such that it is set in accordance with the steam throughput for the demand on the line 32 at any time. In other words, it stands ready to properly supply the necessary amount of steam and is in its required operating position. If a tripout then occurs and the fast acting valve 9 opens suddenly, this proper operating position of the valve 36 insures a steady steam supply to the consumer line 32. The fast acting valve will not close again automatically but can only be closed by hand in the manner described in connection with FIG. 2.

The positioner of the present invention has been described in connection with a fast acting valve in a steam turbine installation. The basic design and manner of operation of the positioner, however, can be applied in principle in other applications. Generally, in any case where a valve or other element must be held securely in a contact-making position but which must be moved or opened quickly without delay, the positioner of the present invention may be used.

I claim:

1. A hydraulic positioner for a valve or the like comprising:
    (a) a housing;
    (b) a stepped differential piston disposed within said housing for motion therein;
    (c) a coupling member coupled to act on the valve;
    (d) a closing spring disposed inside said piston and acting between said piston and said coupling member in a first direction;
    (e) an opening spring disposed within said housing between the bottom of said housing and said coupling member acting in a second direction opposite said first direction;
    (f) a hydraulic latching system supplied with an oil pressure coupled to act on said differential piston so as to hold said opening and closing springs cocked against each other when said oil pressure is present, at the same time holding said coupling member, in a first, normal position, whereby, if said oil pressure drops, said closing spring is first released causing said differential piston to move upward whereafter said opening spring is free to move said coupling member from said first position to a second position suddenly.

2. The positioner according to claim 1 wherein said coupling member acts on a fast acting valve.

3. The positioner according to claim 2 wherein said fast acting valve is a valve which is normally closed when said coupling member is in said first, normal position.

4. A positioner according to claim 1 wherein said stepped differential piston includes an upper portion which is guided in said housing and a lower portion, said lower portion disposed in a correspondingly enlarged chamber of said housing and wherein said hydraulic latching system includes an inlet in said enlarged chamber and an outlet in said enlarged chamber, said inlet adapted to be coupled to said source of pressure and said outlet arranged so as to be covered by said differential piston when in the cocked position.

5. A positioner according to claim 1 and further including means for moving said piston and actuator back to a cocked position after operation.

6. The positioner according to claim 5 and further including means to mechanically lock said piston in said cocked position.

7. The positioner according to claim 5 wherein said means for moving comprise a hand wheel having a threaded shaft disposed thereon; and a threaded sleeve on said hand wheel shaft, said hand wheel and sleeve being disposed above said piston and arranged to act upon the top thereof to push it downward into a cocked position when said hand wheel is operated.

8. The positioner according to claim 5 wherein said means for moving comprise means for supplying an oil pressure to a space above said differential piston to thereby push it downward into the cocked position.

9. The positioner according to claim 8 and further including:
   (a) an extension of said differential piston extending upward, said extension having a transverse hole formed therein;
   (b) a cylinder disposed transverse to said differential piston;
   (c) a spring loaded piston having on the end thereof a latching pin disposed in said transverse cylinder; and
   (d) means to supply oil under pressure to said cylinder to act on said piston against the force of said spring, whereby release of the oil pressure permits said piston to be moved causing said latching pin to engage in said transversal hole to lock said differential piston in a cocked position and whereby supplying oil pressure to said cylinder will cause said latching pin to be retracted leaving said differential piston in a ready state.

10. The positioner according to claim 9 wherein said means for supplying pressure to said space above said differential piston and to said cylinder comprise a plurality of control valves coupled to be controlled as a function of said hydraulic latching system oil pressure.

* * * * *